Figure 1:
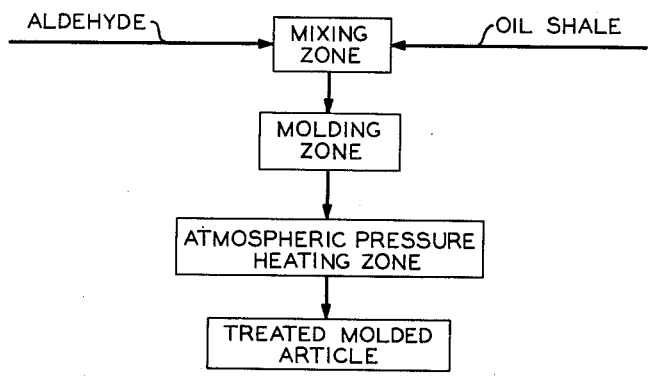

3,061,451
THERMOPLASTIC AND THERMOSET MOLDED ARTICLES OF OIL SHALE AND METHOD FOR PRODUCING THE SAME
Harry W. Parker and John W. Marx, Bartlesville, Okla., assignors to Phillips Petroleum Company, a corporation of Delaware
Filed Aug. 15, 1960, Ser. No. 49,460
20 Claims. (Cl. 106—241)

This invention relates to a method for manufacturing thermoplastic or thermoset molded articles. This invention also relates to a method for preparing molded articles from oil shale wherein the properties of the molded article can be controlled.

This is a continuation-in-part of our copending application, Serial No. 862,035, filed December 28, 1959, now abandoned.

For years it has been desired to manufacture articles having a hard surface from plastic materials. It would be desirable if such plastic materials could be formed from naturally-occurring deposits. Clays have furnished about the only natural source of supply of a base material which can be mined in large quantities and pressed into articles which have little structural strength when dried at low temperatures. However, when fired at high temperatures and glazed, the clays are useful under acid and solvent conditions, which result justifies the high cost of firing and glazing the products. However, for many applications, the glazed products are too brittle and therefore they do not find universal application.

One naturally-occurring substance which can be readily mined in large quantities is oil shales. In general, oil shales are finely-divided, striated materials made up of alternating layers of mineral and organic matter. The mineral matter ranges from pure quartz to highly calcareous matter including calcite and dolomite. The organic matter in oil shales is known as kerogen which, translated from the Greek, means "a producer of wax." It is presumedly a mixture of high molecular weight compounds made up of hydrogen, carbon, nitrogen, oxygen and sulfur. The oil shales range in kerogen characteristics from the benzenoid type, which closely resembles the structure of coals, to the non-benzenoid type which has little if any of the structural characteristics of coals. The Colorado oil shale deposits which are of interest in this invention belong to the latter classification.

It has been proposed to produce molded articles by the combined action of heat and pressure on oil shales containing at least about 45 gallons of recoverable oil per ton of mineral. Although such articles have utility, the process has the disadvantage of being limited to oil shales which are unusually rich in oil content and excludes the vast deposits of oil shales which contain less than 45 gallons of oil per ton of mineral and are, for that reason, more competitive in price for use in the formation of shaped articles than are the richer oil shale deposits. As might be expected, oil shale deposits which assay less than 45 gallons of available oil per ton of mineral are more abundant than are the richer oil shales.

Figure 2:
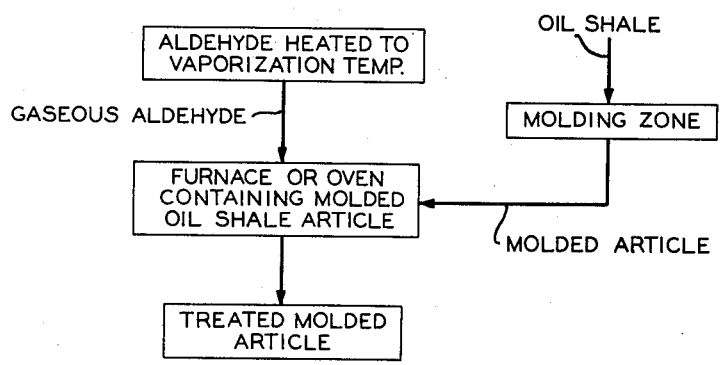

It is an object of this invention to provide compositions, for molding and for formation into shaped articles, from oil shales containing from 15 to 85 or more gallons of recoverable oil per ton of oil shale. It is also an object of this invention to provide compositions, for molding and for formation into shaped articles, containing oil shales so that the resulting molded articles exhibit properties of hardness superior to molded articles wherein oil shale alone is used. It is also an object of this invention to provide shaped articles whose characteristics of hardness are controlled within predetermined ranges. Still another object of this invention is the provision of molding compositions for producing either thermoplastic or thermoset molded articles. Still another object is the provision for hardening articles molded from oil shale. Other objects and advantages will be apparent to one skilled in the art upon study of this disclosure, including the detailed description of the invention and the drawing wherein:

FIGURE 1 is a schematic flow diagram illustrating steps of simultaneously molding and treating an article with an aldehyde; and FIGURE 2 is a schematic flow diagram illustrating steps of molding an article and subsequent treatment of the article with an aldehyde.

We have found that mixtures of finely-divided oil shale and liquid, or finely-divided solid aldehydes, can be molded into articles which possess superior values of hardness as compared to articles molded from oil shale alone. We have found that oil shales containing as little as 15 gallons of recoverable oil per ton of mineral can be utilized in making the molding compositions of the invention. Articles produced from the molding compositions of this invention display lasting beauty, good mechanical strength, and high electrical resistivity, as well as controlled characteristics of hardness.

We have further found that articles molded from oil shale can be hardened by heating in the presence of gaseous aldehyde. Substantially the same superior values of hardness are obtained in molded articles heated in the presence of gaseous aldehyde as when solid or liquid aldehyde is mixed with the oil shale prior to molding. When gaseous aldehyde is contacted with the molded oil shale at elevated temperature the gaseous aldehyde penetrates the surface of the oil shale to the interior so that the hardening can be obtained in the surface of the article to any desired depth. A pulsating gas pressure can be employed to cause a deeper penetration of the aldehyde gas. The thickness of the hardened surface can be controlled by the amount of aldehyde gas utilized or by the length of treatment or by the treating temperature or a combination of these conditions. The aldehyde content of the atmosphere enveloping the molded oil shale can vary from about 10 to about 100 percent; the temperature can vary from about 300 to about 600° F.; and the time can vary from about 5 minutes to about 10 hours or longer.

Oil shales having a recoverable, non-benzenoid type oil content of from 15 to 85 or more gallons per ton of mineral are crushed or ground to an average particle size such as to pass through a 50 to 200-mesh screen and the ground oil shale is then intimately admixed with a liquid or finely-divided aldehyde, after which the mixture is subjected to heat and pressure to produce the desired shaped article if the article is to be simultaneously molded and hardened. The mixture is placed in a closed mold and heated to a temperature in the range of about 250 to about 400° F. while applying a pressure of about 500 to about 20,000 p.s.i., or higher, for about ½ to 10 minutes. The mold is then cooled to a temperature generally below 250, and preferably below 212° F., before the pressure is released. The molding temperature is, in every case, below the decomposition temperature of the kerogen present in the oil shale. The molding time will be that necessary to plasticize the kerogen, and presumably to provide contact between the kerogen and the aldehyde present in the mixture.

Although oil shales containing less than 15 gallons of recoverable oil per ton of mineral are not considered satisfactory molding compositions, the aldehyde treatment improves the resulting molded articles, and thereby renders usable oil shales which are otherwise unusable for this purpose.

When utilizing aldehydes which are volatile, such as acetaldehyde, or gaseous, such as formaldehyde, in the simultaneous molding and hardening of shale oil, it is preferred to polymerize the aldehyde prior to use whereby the aldehyde can be utilized in liquid or solid form. Thus, aldehydes which are particularly useful in the practice of this invention include paraformaldehyde, paraldehyde, furfural, propionaldehyde, piperonal, benzaldehyde, citronellal, citral, and the like. Paraformaldehyde is particularly suitable for premixing with the oil shale or for treating a molded article with gaseous aldehyde because it is easily converted into a gaseous form, i.e., formaldehyde. Any aldehyde which will volatilize at a temperature below the treating temperature, e.g., below about 600° F., can be utilized in either aspect of this invention, i.e., premixing of aldehyde and oil shale or treating the molded oil shale with gaseous aldehyde. The aldehyde utilized in either aspect of the invention should have a vapor pressure of at least 50 to 100 millimeters of mercury at a temperature of 300 to 500° F. The lower molecular weight aldehydes such as acetaldehyde and formaldehyde are preferred because of the relatively small amount of inactive material attached to the active aldehyde radical. These low molecular weight aldehydes can be conveniently generated by heating paraformaldehyde to obtain formaldehyde or by heating paraldehyde in the presence of a small amount of mineral acid to obtain acetaldehyde.

It is believed that a reaction occurs between the aldehyde and the kerogen at temperatures of about 300° F. and over, because objects molded from the compositions of this invention are thermoplastic unless they are heated for a time at a temperature above about 300° F. whereby the composition becomes thermoset. The nature or positive identification of the reaction has not been determined at the present time and there appears to be some evidence of reaction at molding temperatures because the molded articles wherein aldehyde is utilized display superior characteristics of hardness over molded articles of oil shale alone.

The aldehyde is incorporated in the oil shale in an amount equivalent to about 0.25 to 1.25 mols of aldehyde per 100 parts by weight of kerogen of the oil shale. Units must be consistent for both mols of aldehyde and weight of oil shale. Some beneficial result will be obtained using an even smaller amount of aldehyde, and more aldehyde can be used than in the above range although the excess will usually be volatilized and lost without providing any particular beneficial result.

Satisfactory compositions can be prepared by dry-blending the finely-divided oil shale and the liquid or finely-divided solid aldehyde, although it is usually preferred to utilize procedures similar to those employed in the rubber industry, for example, milling or Banbury mixing, to reduce the materials to substantially homogeneous state. Extruders or extrusion rolls can be utilized to introduce the mixture into the molds. Care should be taken in blending the oil shale and aldehyde to avoid attaining a temperature at which the aldehyde will be volatilized and lost before it comes into intimate contact with the kerogen of the oil shale.

The molded articles can be prepared by placing the mixture in the mold and heating at molding pressure to a temperature in the range of about 300 to about 500° F. for about 2 to about 50 hours to obtain a thermoset molded article; or the molded articles which have been molded at temperatures of 250 to about 400° F. can be heated at atmospheric pressure to a temperature of about 300 to about 500° F. for about 2 to 50 hours to obtain such thermoset molded articles.

The molding compositions of this invention are useful in the preparation of molded articles having a hard, homogeneous surface and considerable mechanical strength, such as for use in the manufacture of building materials including siding, roofing, and flooring or paving materials. Articles molded from oil shale and heated in an atmosphere of gaseous aldehyde are also useful for the above purposes. The molded compositions which have been heated so as to produce thermoset compositions are particularly useful as load-bearing units, such as building or paving blocks.

The following specific examples present data which illustrate and clarify the invention, but should not be so interpreted as to limit the invention unnecessarily.

*Example I*

A sample of Colorado oil shale was ground to pass a 100-mesh screen, and 95 parts by weight of the shale powder was mixed with 5 parts by weight of powdered paraformaldehyde. The oil shale assayed 30 gallons per ton of recoverable shale oil and had a non-benzenoid kerogen content which is normally associated with Colorado oil shales.

The mixed powder was placed in a 1¼-inch cylindrical mold, was heated under 5,000 p.s.i. pressure to 316° F. and allowed to cool to approximately room temperature. The heating and cooling cycle required approximately 90 minutes. The molded disk had a Shore "D" hardness of 85.

*Example II*

As a control, a sample of the powdered oil shale used in Example I was molded in the same manner as the mixture. The resulting disk had a typical Shore "D" hardness of 82.

*Example III*

The disk of Example I was heated in an oven for 20 hours, at 220° F. The resulting disk had a Shore "D" hardness of 80. The disk was heated again at 380° F. for 3 hours to result in a Shore "D" hardness of 89. The disk was heated again for 20 hours at 300° F., resulting in a disk with a Shore "D" hardness of 92.

*Example IV*

Two mixtures of oil shale and paraformaldehyde were mixed for comparison. The first mixture was 95/5 weight percent oil shale in paraformaldehyde. The second mixture was 97.5/2.5 weight percent oil shale in paraformaldehyde. Disks of these two powders were molded along with a disk made from 100 percent shale. The three disks were molded at 316° F. for 4 minutes at 5,000 p.s.i. pressure, followed by cooling under pressure to approximately room temperature before opening the mold. The heating and cooling cycle required 20 minutes.

The Shore "D" hardness of both disks containing paraformaldehyde was 84. The disk made of 100 percent oil shale had a Shore "D" hardness of 82.

*Example V*

A disk was made from 95/5 oil shale in paraformaldehyde by molding under the conditions given in Example IV. This material was crushed to a powder and remolded under the same conditions as before. Both the original and remolded disks had a Shore "D" hardness of 84, which indicates that the molded articles are still thermoplastic. Another disk was prepared as in Example IV, then heated for 16 hours at 320° F. prior to crushing and remolding. This disk was very soft (Shore "D" 0), indicating that long heating results in a thermoset material.

*Example VI*

A mixture of powdered oil shale, as prepared in Example I, and 14 weight percent furfural was molded at 316° F. for 4 minutes at 5,000 p.s.i. pressure, followed by cooling to room temperature before opening the mold. The molded disk had a Shore "D" hardness of 85 compared to a control pressed under the same conditions from 100 percent oil shale which had a Shore "D" hardness of 83. Heat treatment of the furfural-containing disk for 16 hours at 340° F. increased the hardness to 88.

In the above examples, 5 parts by weight of paraformaldehyde per 95 parts by weight of oil shale represents about 1.25 mols of formaldehyde per 100 parts by weight of kerogen since the molecular weight of formaldehyde is about 30. Similarly, 14 weight percent of furfural in the mixture of furfural and oil shale represents about 1.25 mols of furfural per 100 parts by weight of kerogen since furfural has a molecular weight of about 96.

*Example VII*

A sample of Colorado oil shale which assayed 30 gallons of recoverable shale oil per ton of mineral was ground to pass a 100-mesh screen and was molded in a 1¼-inch cylindrical mold at a pressure of 4,000 p.s.i. pressure for 35 minutes during which time a peak temperature of 672° F. was reached. This sample of oil shale was known to produce molded articles of less hardness characteristics than those molded from the oil shale sample used in Example I. The molded disk had a Shore "D" hardness of 76. The disk was broken in half and one half of the disk was heated in a tube furnace for 3½ hours at 390° F. in an atmosphere of formaldehyde produced by heating paraformaldehyde to a temperature of 250° F. The other half disk was heated in a tube furnace for 2 hours without the atmosphere of aldehyde.

After cooling to room temperature, the samples were tested for hardness. The sample which was heated in the atmosphere of formaldehyde had a Shore "D" hardness of 86 compared to a Shore "D" hardness of 75 for the sample heated in the absence of formaldehyde. It should be noted that heating in the absence of formaldehyde decreased the hardness of the sample somewhat. The sample heated in the atmosphere of formaldehyde was darkened and upon breaking the sample it was determined that the interior of the sample was darkened throughout, indicating that the 3/16-inch thick sample had been entirely penetrated by the formaldehyde treatment.

Reasonable variations and modifications are possible within the scope of this disclosure without departing from the spirit and scope of the invention.

That which is claimed is:

1. The process of hardening an article molded from oil shale which comprises intimately contacting said article molded from oil shale with an aldehyde which will volatilize at the contacting conditions employed; and subjecting the article molded from oil shale to a temperature in the range of about 300 to about 500° F. in the presence of said aldehyde.

2. The process of claim 1 wherein the aldehyde is paraformaldehyde.

3. The process of claim 1 wherein the aldehyde is furfural.

4. The process of claim 1 wherein the aldehyde is piperonal.

5. The process of claim 1 wherein the aldehyde is benzaldehyde.

6. The process of claim 1 wherein the aldehyde is paraldehyde.

7. The process of making molded articles which comprises intimately admixing an aldehyde which will volatilize at the molding temperature and oil shale; subjecting the mixture to molding pressure and a molding temperature of about 250 to about 400° F. for about ½ to about 10 minutes; cooling to a temperature below about 212° F.; removing from the mold; and heating to a temperature of about 300 to about 500° F. at atmospheric pressure for about 2 to about 50 hours.

8. The process of making a molded article which comprises intimately admixing a finely-divided oil shale having a non-benzenoid kerogen content of at least 15 gallons per ton of mineral, and an aldehyde which will volatilize at the molding temperature, in the amount of about 0.25 to 1.25 mols of aldehyde per 100 parts by weight of kerogen of the oil shale; molding the admixture at a pressure of about 500 to about 20,000 p.s.i. at a temperature of about 250 to about 400° F. for about ½ to 10 minutes; cooling to a temperature below about 212° F.; and removing the article from the mold.

9. The process of claim 8 wherein the oil shale is a Colorado oil shale containing about 20 to 40 gallons of recoverable oil per ton of mineral; and the aldehyde is paraformaldehyde.

10. The process of claim 9 wherein the oil shale contains about 30 gallons of recoverable oil per ton of mineral; the paraformaldehyde is present in an amount of about 1.25 mols per 100 parts by weight of the kerogen present; the molding pressure is about 5,000 p.s.i.; the molding temperature is about 320° F.; and the molding time is about 4 minutes.

11. The process of claim 10 wherein the molded article is heated for about 3 to 20 hours at atmospheric pressure and a temperature of about 300 to 400° F.

12. The process of claim 8 wherein the oil shale is a Colorado oil shale containing about 20 to 40 gallons of recoverable oil per ton of mineral and the aldehyde is furfural.

13. The process of claim 12 wherein the oil shale contains about 30 gallons of recoverable oil per ton of mineral; the furfural is present in about 3 to about 15 weight percent of the total; the molding pressure is about 5,000 p.s.i.; the molding temperature is about 320° F.; and the molding time is about 4 minutes.

14. The process of claim 13 wherein the molded article is heated for about 3 to 20 hours at atmospheric pressure and a temperature of about 300 to 400° F.

15. A molded article comprising the product obtained by molding oil shale in the presence of a gaseous aldehyde at molding pressure and a temperature of about 300 to about 500° F. for about ½ to 10 minutes.

16. A thermoset molded article prepared by molding an admixture of oil shale and about 0.25 to 1.25 mols of an aldehyde which will volatilize at the molding temperature per 100 parts by weight of kerogen in the oil shale, at a pressure of about 500 to 20,000 p.s.i. and a temperature of about 250 to 400° F. for about ½ to 10 minutes, after which the molded article is heated at atmospheric pressure for about 2 to 50 hours at a temperature of about 300 to about 500° F.

17. A process for increasing the hardness of an article molded from oil shale which comprises heating said article to a temperature in the range of about 300 to about 600° F. for a period of time in the range of about 5 minutes to about 10 hours in an atmosphere containing about 10 to about 100 percent of a gaseous aldehyde.

18. The process of claim 17 wherein the aldehyde is formaldehyde generated from paraformaldehyde.

19. The process of claim 17 wherein the aldehyde is acetaldehyde generated from paraldehyde.

20. A thermoplastic molded article prepared by molding an admixture of oil shale and about 0.25 to 1.25 mols of an aldehyde, which will volatilize at the molding temperature, per 100 parts by weight of kerogen in the oil shale, at a pressure of about 500 to 20,000 p.s.i. and a temperature of about 250 to about 400° F. for about ½ to 10 minutes.

References Cited in the file of this patent

UNITED STATES PATENTS

| | | |
|---|---|---|
| 2,864,715 | Glab | Dec. 16, 1958 |
| 2,872,330 | Glab | Feb. 3, 1959 |
| 2,900,269 | Bauman et al. | Aug. 18, 1959 |